(12) United States Patent
Sumi et al.

(10) Patent No.: US 10,488,283 B2
(45) Date of Patent: Nov. 26, 2019

(54) PEDAL STEPPING FORCE DETECTOR

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Chiaki Sumi, Chita-gun (JP); Naoya Iesato, Kariya (JP); Yasukuni Ojima, Kariya (JP); Hiroshi Isono, Susono (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/924,810

(22) Filed: Mar. 19, 2018

(65) Prior Publication Data
US 2018/0274998 A1 Sep. 27, 2018

(30) Foreign Application Priority Data
Mar. 24, 2017 (JP) ................. 2017-058967

(51) Int. Cl.
*G01L 5/22* (2006.01)
*B60T 7/04* (2006.01)
*G01L 1/22* (2006.01)
*G05G 1/44* (2008.04)

(52) U.S. Cl.
CPC .............. *G01L 5/225* (2013.01); *B60T 7/042* (2013.01); *G01L 1/2206* (2013.01); *B60T 2270/82* (2013.01); *G05G 1/44* (2013.01)

(58) Field of Classification Search
CPC ... G05G 1/30; G05G 1/44; G01L 5/22; G01L 1/04; G01L 5/225; G01L 1/2206; B60T 7/042; B60T 2270/82
USPC ....................................... 73/862.627
See application file for complete search history.

(56) References Cited

U.S. PATENT DOCUMENTS

| 7,121,154 | B2* | 10/2006 | Saito ................. B60T 7/042 73/862.621 |
| 8,661,811 | B2* | 3/2014 | Hirano .............. B60T 13/144 60/547.1 |
| 8,914,191 | B2* | 12/2014 | Bohn ................. B60T 7/042 701/36 |
| 9,238,453 | B2* | 1/2016 | Uechi ................ B60T 11/16 |
| 9,821,776 | B2* | 11/2017 | Mayer ............... B60T 13/567 |
| 10,046,744 | B2* | 8/2018 | Oosawa ............ B60T 8/4081 |
| 10,351,117 | B2* | 7/2019 | Isono | |

(Continued)

FOREIGN PATENT DOCUMENTS

| DE | 103 35 598 A1 | 2/2005 |
| JP | 2004-3908 A | 1/2004 |
| JP | 2011-11659 | 1/2011 |

(Continued)

*Primary Examiner* — Octavia Hollington
(74) *Attorney, Agent, or Firm* — Oblon, McClelland, Maier & Neustadt, L.L.P.

(57) ABSTRACT

A pedal stepping force detector includes a rod, a case having a bottomed-cylindrical shape and extending along a longitudinal direction of the rod, a strain body housed in a bottom portion of the case, an operating body that is housed in the case so that the operating body is in contact with the strain body, and an elastic member that is compressed in association with an operation of the rod and thus causes biasing force to act on the operating body

10 Claims, 7 Drawing Sheets

(56) References Cited

U.S. PATENT DOCUMENTS

2015/0090021 A1    4/2015  Mayer
2019/0232928 A1*  8/2019  Adachi .................. B60T 7/042

FOREIGN PATENT DOCUMENTS

| JP | 2013-250161 | 12/2013 |
| JP | 2014-102155 | 6/2014 |
| JP | 2016-161492 | 9/2016 |
| WO | WO 2017/043659 A1 | 3/2017 |

* cited by examiner

PEDAL STEPPING FORCE DETECTOR

INCORPORATION BY REFERENCE

The disclosure of Japanese Patent Application No. 2017-058967 filed on Mar. 24, 2017 including the specification, drawings and abstract is incorporated herein by reference in its entirety.

BACKGROUND

1. Technical Field

The disclosure relates to a pedal stepping force detector that detects stepping force acting on a pedal as an electric signal.

2. Description of Related Art

A technology that detects stepping force acting from an input shaft that is operated by a brake pedal is described in Japanese Unexamined Patent Application Publication No. 2011-11659 (JP 2011-11659 A). With this technology, a stepping force detector (load detecting means in the literature) includes a magnetostrictive sensor having a magnetostrictive film, and a coil that generates magnetism, and detects stepping force based on magnetovariation associated with an operation of the pedal.

In JP 2011-11659 A, a structure is provided. In this structure, the input shaft advances and retracts due to stepping force of the brake pedal, and a master cylinder is operated by an output shaft connected with the input shaft, thereby supplying brake oil to each brake mechanism. At the same time, a pinion gear of a motor is engaged with rack teeth formed in the output shaft, and the motor is driven based on a detection result from the stepping force detector. Thus, assist force of the motor operates the master cylinder.

SUMMARY

For example, in a vehicle such as an automobile, a structure is considered where a sensor is provided, the sensor electrically detecting stepping force when a brake pedal is stepped on, and a brake is controlled based on a detection result from the sensor. In this structure, although electric wiring, and electric actuators that make braking force act on each wheel are required, pipes for brake oil are not necessary. Since it is possible to adjust each of the electric actuators, it is easy to adjust brake force that acts on the four wheels when the brake pedal is depressed.

However, as described in JP 2011-11659 A, with a structure in which a strain sensor or the like is used to detect force acting on the rod-shaped input shaft that directly operates the master cylinder, when the rod is tilted while the brake is operated, it is conceivable that detection of stepping force by the strain sensor is not accurate, and could contain errors.

Also, with a structure in which a brake is operated by electric control based on a detection result from a sensor that detects stepping force when a brake pedal is stepped on, an adequate amount of stepping is required for the brake pedal from a viewpoint of operating sense, and it is desired that braking force obtained increases consecutively as an amount of stepping increases.

From these reasons, demanded is a pedal stepping force detector that detects a pedal stepping force at high accuracy and provides natural operating sense of a pedal.

A pedal stepping force detector according to an aspect of the disclosure includes a rod, a case, a strain body, an operating body, and an elastic member. The rod is operated along a longitudinal direction by stepping force from a pedal. The case has a bottomed-cylindrical shape and extends along the longitudinal direction of the rod. The strain body is housed in a bottom portion of the case and includes a strain detecting element that detects strain of the strain body. The operating body is housed in the case so that the operating body is in contact with the strain body. The elastic member is compressed as the rod is operated by stepping force from the pedal and thus causes biasing force to act on the operating body.

According to the above aspect, when the pedal is stepped on and the rod operates in the longitudinal direction, the elastic member is compressed in association with the operation, and thus absorbs a stroke of the pedal. At the same time, biasing force from compression of the elastic member acts on the strain body through the operating body. With this structure, when the pedal is stepped on, biasing force of the elastic member acts on the strain body while a given stroke is produced. Thus, detection of strain of the strain body by the strain detecting element is realized. Further, with this structure, the strain body is disposed in the bottom portion of the bottomed-cylindrical case, and the operating body is operated along an inner surface of the case. Therefore, even when a position of the rod changes as the pedal is stepped on, a positional relation between the strain body and the operating body remains unchanged, thereby minimizing errors contained in detected stepping force. Accordingly, structured is a pedal stepping force detector that detects stepping force of the pedal highly accurately, and provides neutral operation sense of the pedal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a sectional view of the pedal stepping force detector in a situation where a pedal is not stepped on;

FIG. 7 is a sectional view of a pedal stepping force detector according to another embodiment a.

DETAILED DESCRIPTION OF EMBODIMENTS

Hereinafter, embodiments of the disclosure are described based on the drawings.

Basic Structure

Figure 1:
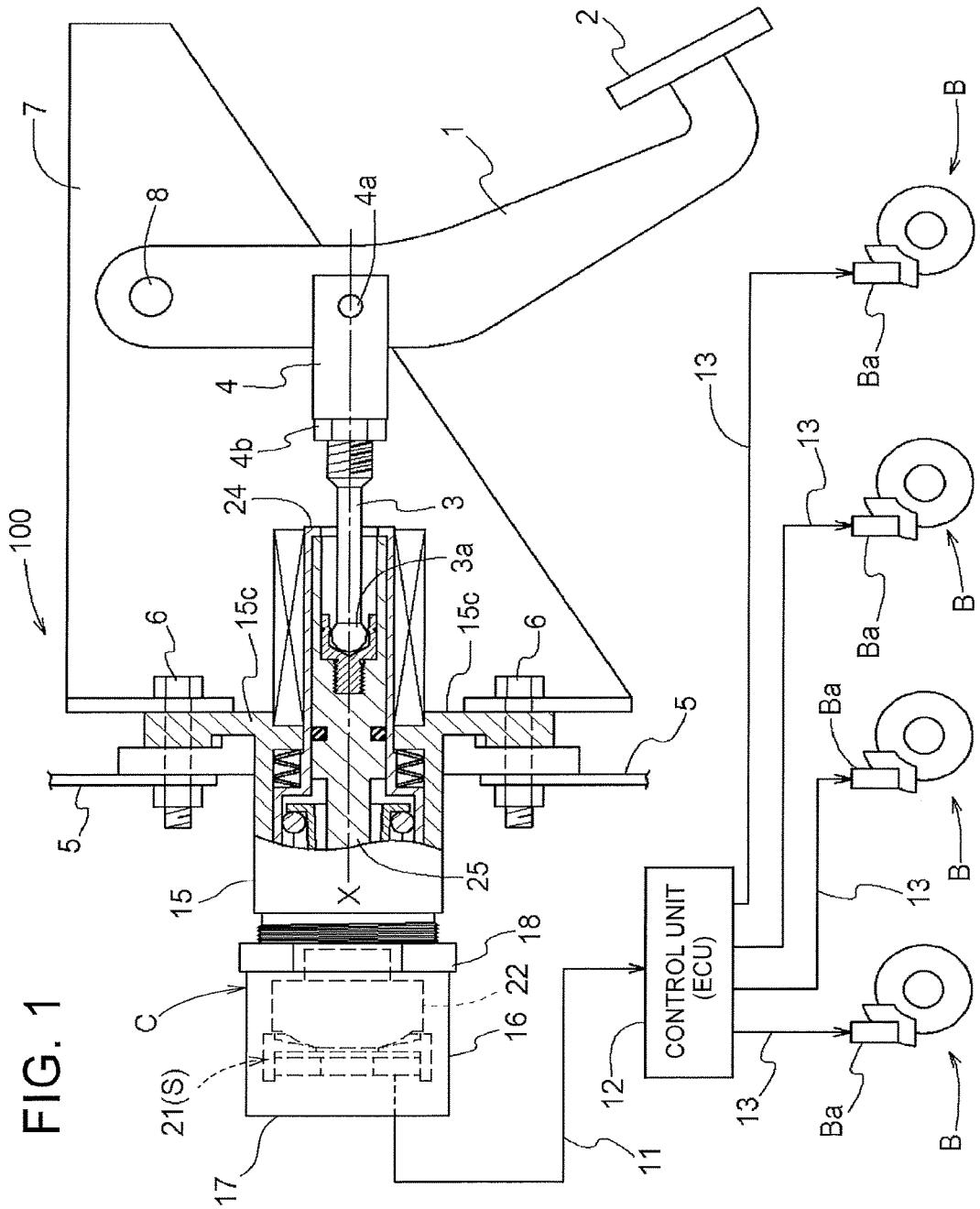
FIG. 1 is a system view showing a pedal stepping force detector and a braking device.

As shown in FIG. 1, a pedal stepping force detector 100 includes a push rod 3, a bottomed-cylindrical case C, and a detection unit S. The push rod 3 is operated in a longitudinal direction by stepping force from a foot pedal 2 provided in a pedal arm 1. The bottomed-cylindrical case C is in a position along the longitudinal direction of the push rod 3. The detection unit S is housed in the case C.

The drawing shows a brake system provided in a vehicle such as an automobile. In the brake system, the detection unit S of the pedal stepping force detector 100 electrically detects stepping operation force onto the foot pedal 2 that is made as a brake pedal, a control unit 12 obtains a detected stepping force signal through a detection wire 11, and the control unit 12 controls actuators Ba of braking devices B through an output wire 13. Thus, braking with braking force in accordance with stepping operation force is realized.

Since the brake system has a structure where electric control is used to control the braking devices B, pipes and brake oil are not required unlike a system where brake oil is used, and it is possible to easily set braking timing and braking force for the braking devices B.

As shown in FIG. 1, a support plate 7 is supported on a vehicle body frame 5 by bolts 6, and the pedal arm 1 is supported on the support plate 7 through a rocking support shaft 8 that is in a transverse position with respect to the support plate 7 so that the pedal arm 1 is able to rock. The push rod 3 is connected with a middle part of the pedal arm 1 through a clevis pin 4a of a clevis 4. Further, a flange portion 15c of the case C is supported on the vehicle body frame 5 together with the support plate 7 through the bolts 6.

Figure 2:
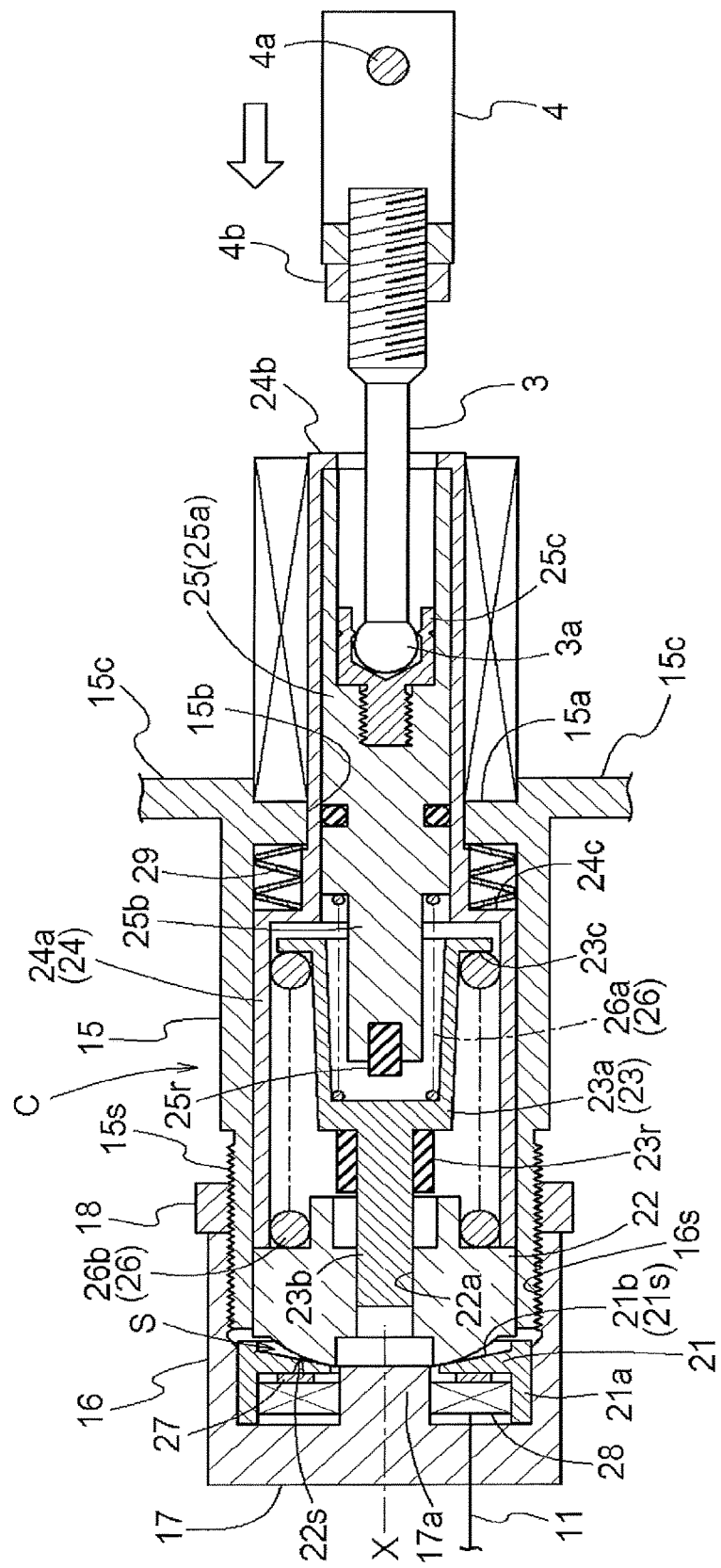

As shown in FIG. 2, an external thread portion of a base end portion (the right side in FIG. 1) of the push rod 3 is screwed to an internal thread portion of the clevis 4, and fixed by a fixing nut 4b. Thus, the push rod 3 is fixed to the clevis 4. Also, in a distal end (the left side in FIG. 1) of the push rod 3, a ball-shaped portion 3a is formed integrally.

In particular, in the pedal stepping force detector 100, when the foot pedal 2 is operated by stepping, force from the operation is transferred to an operating body 22 through an elastic member 26 of the detection unit S, and further to a strain body 21. Therefore, reaction force from elastic deformation of the elastic member 26 acts on the foot pedal 2. Details of the detection unit S are given later.

Case

As shown in FIG. 1 to FIG. 5, the case C is disposed coaxially with a shaft center X, and structured by screwing a first cylindrical portion 15 on an open side and a second cylindrical portion 16 on a bottom wall side to each other and fixing them to each other by a lock nut 18. This means that the case C includes the first cylindrical portion 15 and the second cylindrical portion 16.

In the first cylindrical portion 15, a ring-shaped end portion wall 15a is formed in a position orthogonal to the shaft center X, and an opening 15b that is coaxial with the shaft center X is formed in the end portion wall 15a. Outside of the opening 15b, the flange portion 15c orthogonal to the shaft center X is formed. Further, in an outer periphery of the first cylindrical portion 15 on the opposite side of the first cylindrical portion 15 from the opening 15b, an external thread portion 15s centering around the shaft center X is formed.

In the second cylindrical portion 16, a bottom wall 17 orthogonal to the shaft center X is formed integrally, and, in the bottom wall 17, a shaft-shaped contacted portion 17a is formed. The contacted portion 17a is coaxial with the shaft center X and projects to the push rod side. Further, in an inner periphery of the second cylindrical portion 16 on the opposite side of the second cylindrical portion 16 from the bottom wall 17, an internal thread portion 16s centering around the shaft center is formed.

In the pedal stepping force detector 100, the contacted portion 17a and a later-described projecting portion 23b structure a load limiting mechanism that limits an operation of an intermediate member 23 when the intermediate member 23 reaches an operation limit (when the intermediate member 23 is operated by a predetermined amount), and transfers force from the push rod 3 to the case C.

With the above structure, the external thread portion 15s of the first cylindrical portion 15 and the internal thread portion 16s of the second cylindrical portion 16 are screwed to each other, and rotated relatively about the shaft center X. Thus, it is possible to adjust a length of the case C in a direction along the shaft center X, and, by operating the lock nut 18 so that the lock nut 18 is brought into pressure contact with an opening edge of the second cylindrical portion 16, relative positions of the first cylindrical portion 15 and the second cylindrical portion 16 are decided.

Detection Unit

The detection unit S includes the strain body 21, the operating body 22, the intermediate member 23, a guide body 24, an intermediate rod 25, and the elastic member 26. The elastic member 26 is made of a first spring 26a and a second spring 26b that are helical compression type springs.

As shown in FIG. 2, the strain body 21 is fitted into a bottom portion of the case C (an area of the bottom wall 17 of the second cylindrical portion 16). The strain body 21 includes a ring-shaped portion 21a and a strain portion 21b. The ring-shaped portion 21a has a diameter slightly smaller than an inner diameter of the second cylindrical portion 16. The strain portion 21b is integrally formed in an inner periphery of the ring-shaped portion 21a. In the strain portion 21b, a funnel-shaped pressure-receiving surface 21s centering around the shaft center X is formed so that a contact surface 22s of the operating body 22 is fitted into the pressure-receiving surface 21s.

The strain body 21 is formed from metal such as a stainless steel material and an aluminum material, and an open space is formed in a center of the strain portion 21b. The contacted portion 17a of the bottom wall 17 is inserted into the open space.

The strain body 21 includes a plurality of strain detecting elements 27 in a form where the strain detecting elements 27 are adhered to a surface of the strain body 21 on the opposite side from the pressure-receiving surface 21s. In the second cylindrical portion 16, a detection circuit 28 is housed. The detection circuit 28 has a substrate on the side of the bottom wall 17 from the strain portion 21b. Then, the detection wire 11 described above is drawn outside from the bottom wall 17 so that a detection signal is taken out from the detection circuit 28.

In this embodiment, it is assumed that the four strain detecting elements 27 in which electric resistance changes in accordance with strain are connected with a wheatstone bridge. Further, the strain detecting elements made from semiconductor may be used.

The operating body 22 is formed from metal such as a stainless steel material and an aluminum material, and has an outer peripheral surface having a diameter slightly smaller than that of an inner peripheral surface of the case C (an inner peripheral surface of the first cylindrical portion 15). Also, in the operating body 22, a through-hole 22a that penetrates along the shaft center X is formed, and the spherical contact surface 22s that comes into contact with the pressure-receiving surface 21s of the strain body 21 is formed.

In the intermediate member 23, a main plate 23a orthogonal to the shaft center X, the shaft-shaped projecting portion 23b, and a spring receiving portion 23c are formed integrally. The shaft-shaped projecting portion 23b extends from the main plate 23a in a direction of going through the through-hole 22a coaxially with the shaft center X of the operating body 22. The spring receiving portion 23c is formed in an area of the main plate 23a on the opposite side of the main plate 23a from the projecting portion 23b and has a diameter larger than that of the main plate 23a.

The intermediate member 23 is made from a hard resin material or metal, and the spring receiving portion 23c is formed on the push rod side (the right side in FIG. 2) from the main plate 23a.

In the intermediate member 23, a cylindrical rubber body 23r having a cylindrical shape is provided in a region surrounding a base end position of the projecting portion 23b. The intermediate member 23 reciprocates in a direction along the shaft center X, and, while reciprocating, an outer peripheral surface of the projecting portion 23b comes into sliding contact with an inner peripheral surface of the through-hole 22a of the operating body 22. Therefore, the projecting portion 23b functions as a guide, and restrains a positional change of the operating body 22. Further, when the intermediate member 23 is operated in a direction towards the operating body 22, the cylindrical rubber body 23r comes into contact with the operating body 22 and thus restrains an impact.

The guide body 24 is structured by integrally forming a large diameter cylindrical portion 24a, a small diameter cylindrical portion 24b, and an intermediate wall 24c. The large diameter cylindrical portion 24a is fitted into the case C (the inner peripheral surface of the first cylindrical portion 15). The small diameter cylindrical portion 24b passes through the opening 15b of the case C so that the small diameter cylindrical portion 24b is disposed at a position from inside through outside. The intermediate wall 24c is formed so as to be orthogonal to the shaft center X at a boundary position between the large diameter cylindrical portion 24a and the small diameter cylindrical portion 24b.

The intermediate rod 25 includes a main portion 25a, a contacting shaft portion 25b, and a bush 25c. The main portion 25a is able to move along the shaft center X in a state where the main portion 25a is in contact with an inner peripheral surface of the small diameter cylindrical portion 24b of the guide body 24. The contacting shaft portion 25b has a diameter smaller than that of the main portion 25a and projects from an inner end of the main portion 25a (an end portion on the left side in FIG. 2). The bush 25c is fitted into the main portion 25a on an outer end side (the right side in FIG. 2) in order to receive operating force form the push rod 3.

In the intermediate rod 25, the ball-shaped portion 3a of the push rod 3 is fitted in the bush 25c. Also, a shaft-shaped rubber body 25r is provided in an inner end of the contacting shaft portion 25b. When the intermediate rod 25 is operated in a direction towards the intermediate member 23, the shaft-shaped rubber body 25r comes into contact with the main plate 23a of the intermediate member and thus restrains an impact.

The first spring 26a is a helical compression type spring, is disposed in an outer periphery of the contacting shaft portion 25b of the intermediate rod 25, and causes biasing force to act between the intermediate rod 25 and the main plate 23a of the intermediate member 23. The second spring 26b is a helical compression type spring, and causes biasing force to act between the spring receiving portion 23c of the intermediate member 23 and the operating body 22.

In the pedal stepping force detector 100, the first spring 26a and the second spring 26b form the elastic member 26. In particular, a spring constant of the first spring 26a is set to be smaller than a spring constant of the second spring 26b.

Further, between the intermediate wall 24c of the guide body 24 and the end portion wall 15a of the first cylindrical portion 15, a plurality of disc springs 29 is provided. The disc springs 29 decide the position of the guide body 24 in the direction along the shaft center X, and apply an initial load.

This means that, due to an initial load acting from the disc springs 29, an inner end (the left end in FIG. 2) of the guide body 24 is in contact with the operating body 22 even when the foot pedal 2 is not stepped on. Thus, the contact surface 22s of the operating body 22 is maintained in contact with the pressure-receiving surface 21s of the strain body 21 (a state where there is no play). Thus, when the foot pedal 2 is stepped on, pressure acts on the strain body 21 from the beginning of the stepping operation, and accurate detection without time lag is realized.

Detection Configuration

Figure 6:
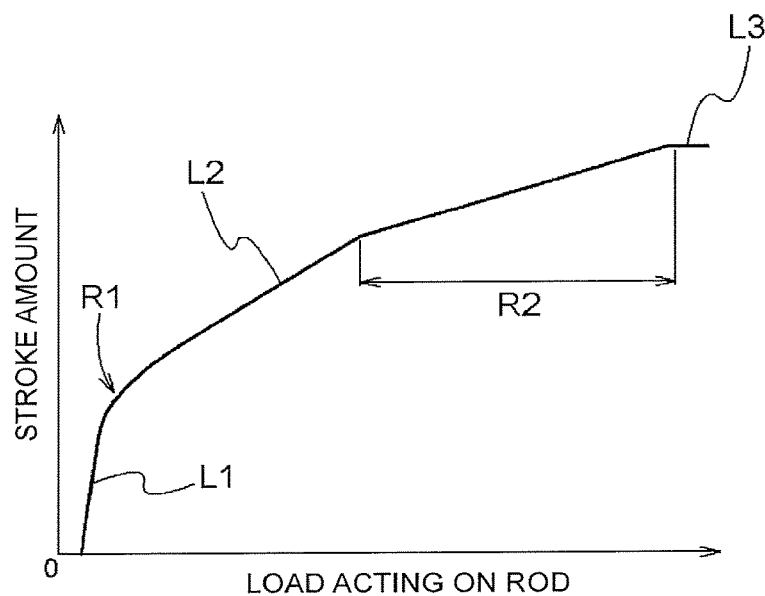
FIG. 6 is a graph showing a relationship between a load when the pedal is stepped on, and a stroke amount.

FIG. 6 shows a relation between a load acting on the push rod 3 (a load acting on the rod) and an operation amount (a stroke amount) of the intermediate rod 25 when the foot pedal 2 is stepped on.

In the pedal stepping force detector 100, when the foot pedal 2 is stepped on, an area of the ball-shaped portion 3a of the push rod 3 permits a position change of the push rod 3, and, since the push rod 3 operates in the longitudinal direction, the intermediate rod 25 operates along the longitudinal direction (the shaft center X).

In accordance with this operation, the first spring 26a and the second spring 26b serving as the elastic member 26 are compressed, thus absorbing a stroke of the stepping operation of the foot pedal 2. At the same time, since biasing force from compression of the first spring 26a and the second spring 26b acts on the operating body 22, the contact surface 22s of the operating body 22 comes into contact with and thus applies pressure to the pressure-receiving surface 21s of the strain body 21. Then, the strain body 21 is slightly deformed elastically, and the elastic deformation is detected by the strain detecting elements 27.

In particular, as shown in FIG. 2, in an early stage of the stepping operation of the foot pedal 2, the first spring 26a and the second spring 26b are compressed simultaneously. However, since the spring constant of the first spring 26a is smaller than the spring constant of the second spring 26b, the first spring 26a is mainly compressed until the shaft-shaped rubber body 25r of the intermediate rod 25 comes into contact with the main plate 23a of the intermediate member 23 as shown by characteristic L1 in FIG. 6, and a change of a load acting on the push rod 3 is small for an stroke amount of the push rod 3.

Figure 3:
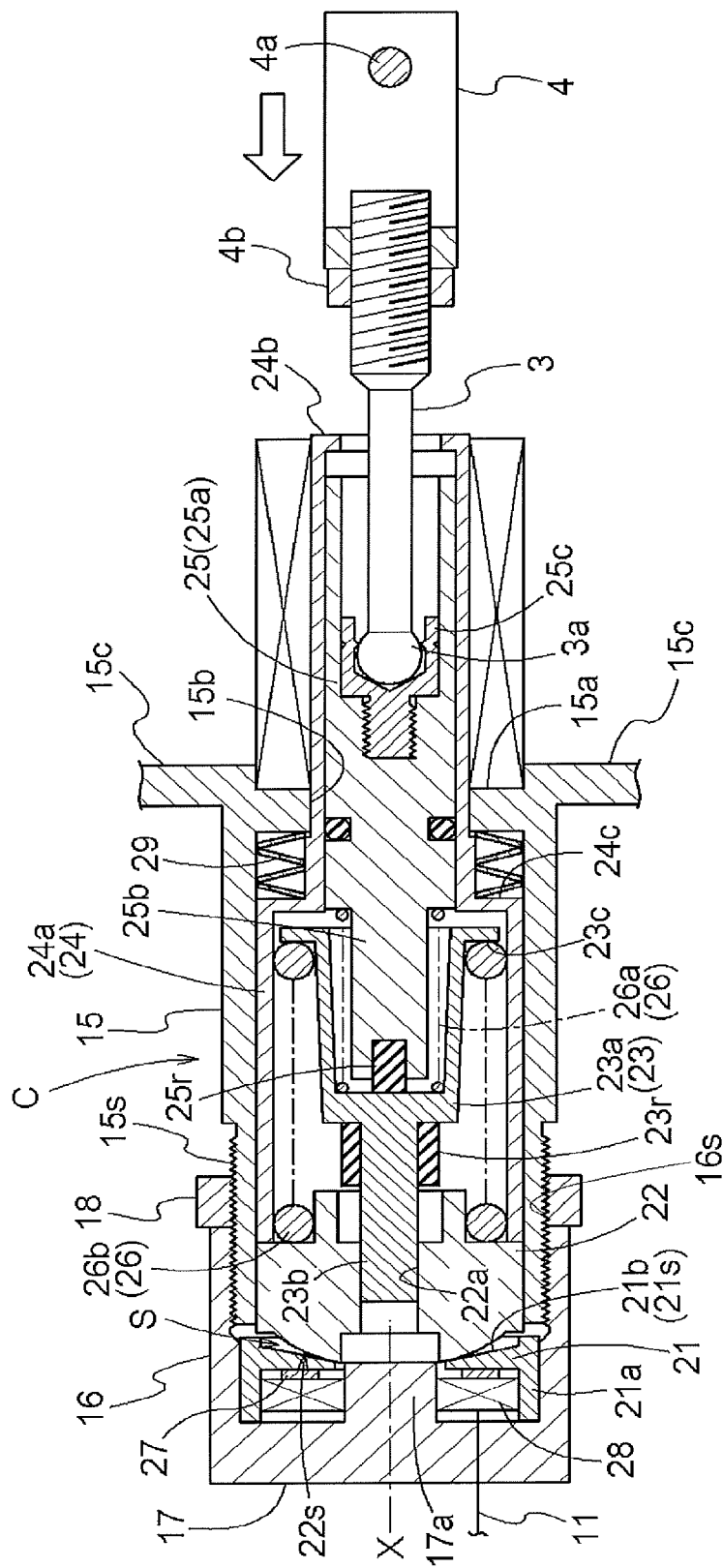
FIG. 3 is a sectional view of the pedal stepping force detector in an early state of pedal stepping.

As described above, mainly because of the characteristic of the first spring 26a, in an early stage of the stepping operation, it is possible to step on the pedal greatly with relatively light stepping force (characteristic L1), and a load acting on the foot pedal 2 is relatively small. Then, as shown in FIG. 3, after the shaft-shaped rubber body 25r of the intermediate rod 25 comes into contact with the main plate 23a of the intermediate member 23, the shaft-shaped rubber body 25r is compressed. Therefore, as shown by first buffering characteristic R1 in FIG. 6, a relation between a load acting on the push rod 3 and an operation amount of the intermediate rod 25 changes.

Figure 4:
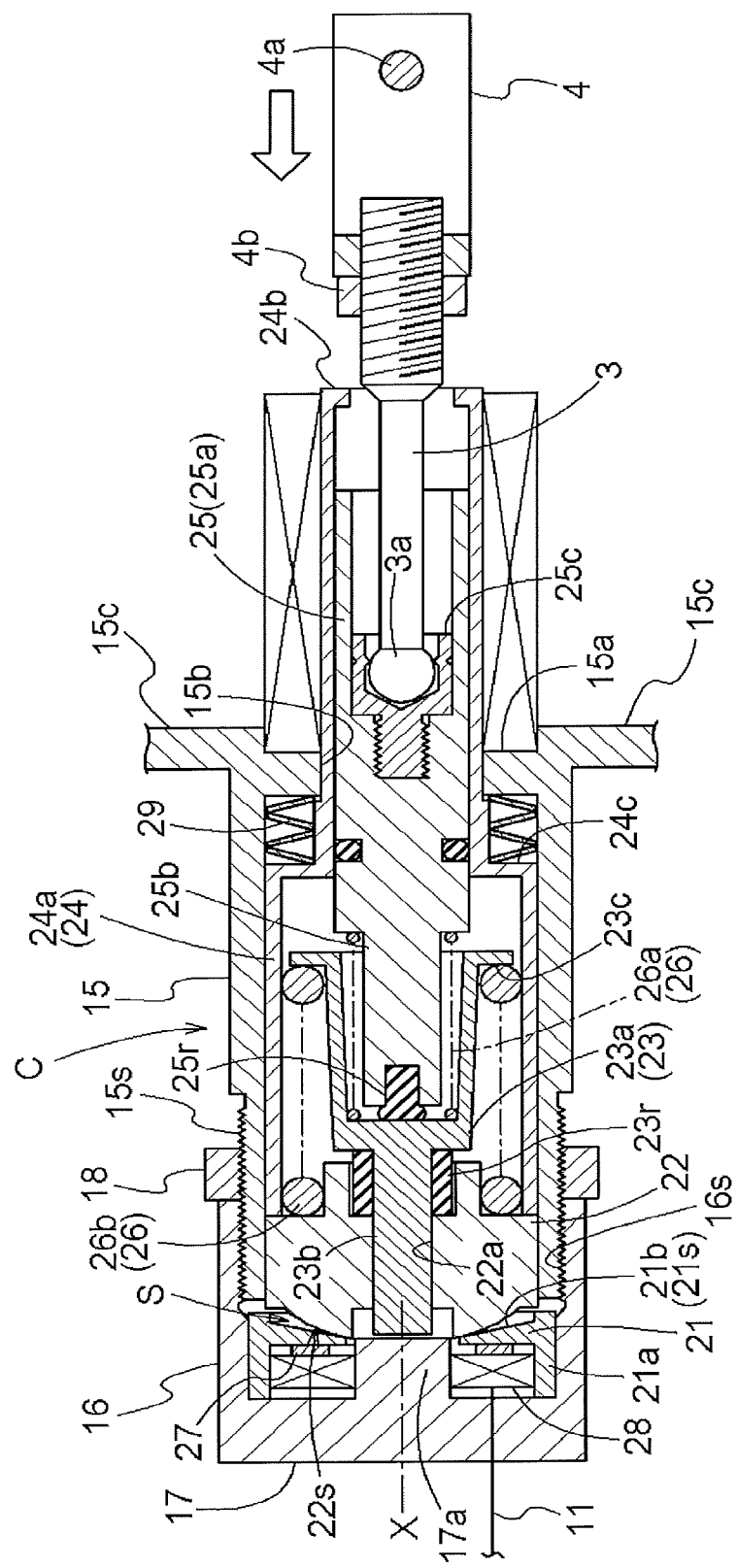
FIG. 4 is a sectional view of the pedal stepping force detector in a situation where the pedal is stepped on further.

Thereafter, as shown in FIG. 4, since the contacting shaft portion 25b of the intermediate rod 25 and the intermediate member 23 operate integrally, when the operation of the foot pedal 2 continues, biasing force from compression of the second spring 26b acts on the operating body 22. Therefore, as shown by characteristic L2 in FIG. 6, a change of a load acting on the push rod 3 becomes large for a stroke amount of the push rod 3, and a load acting on the foot pedal 2 increases.

Then, after the cylindrical rubber body 23r comes into contact with the operating body 22, the cylindrical rubber body 23r is compressed. Therefore, as shown as a second buffering characteristic R2 in FIG. 6, the relation between a load acting on the push rod 3 and an operational amount of the intermediate rod 25 changes gently.

Figure 5:
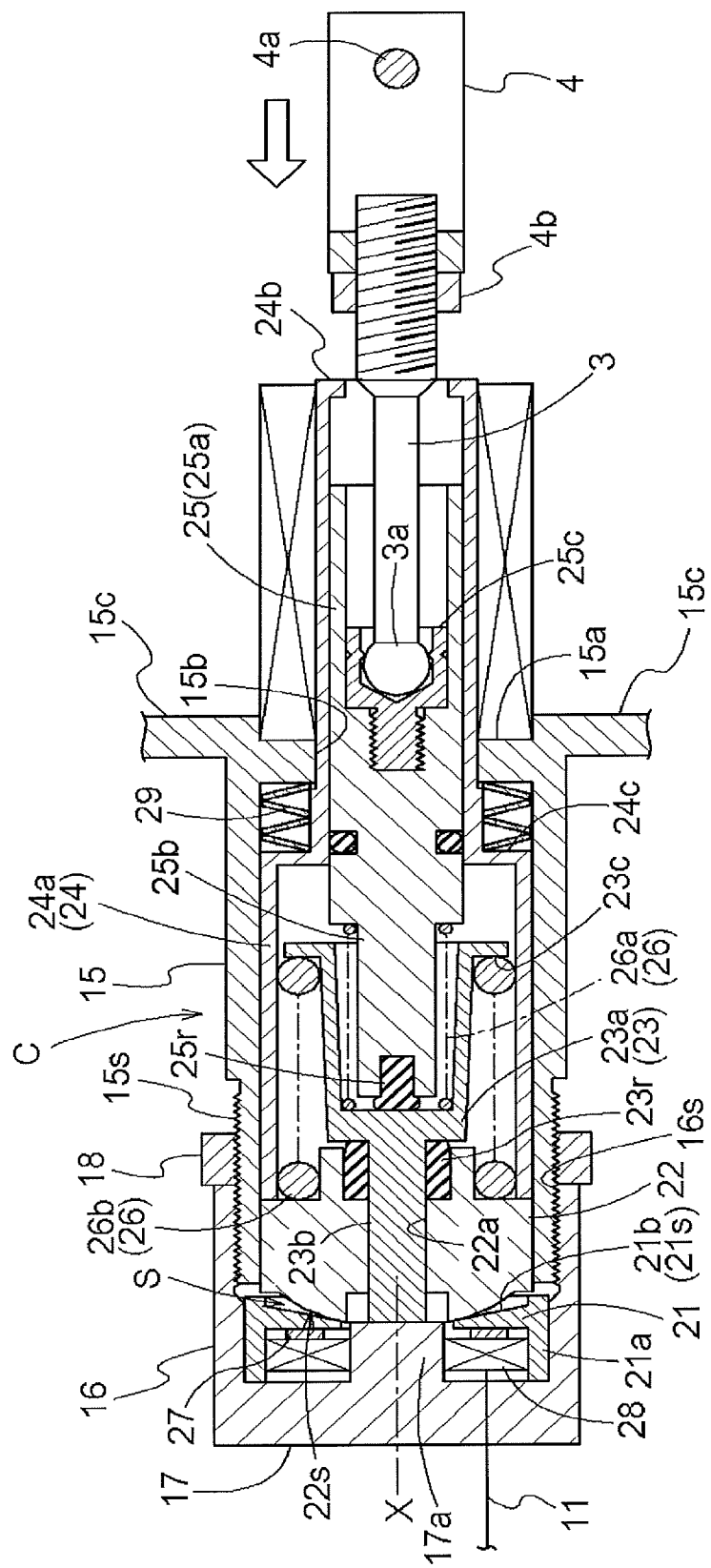
FIG. 5 is a sectional view of the pedal stepping force detector in a situation where the pedal is stepped on to the limit.

As described earlier, the contacted portion 17a and the projecting portion 23b structure the load limiting mechanism. Therefore, eventually, as shown in FIG. 5, as the projecting portion 23b of the intermediate member 23 comes into contact with the contacted portion 17a of the bottom wall 17, an operation of the intermediate member 23 is limited, and an amount of stepping of the foot pedal 2 reaches the limit. Thus, a state is reached where force from the push rod 3 is transferred to the case C, and the operating body 22 is not displaced even when stepping force of the foot pedal 2 is increased (characteristic L3). Further, in this state where the limit is reached, biasing force from compression of the first spring 26a, the second spring 26b, the shaft-shaped rubber body 25r, and the cylindrical rubber body 23r acts on the operating body 22 continuously, and detection by the detection unit S continues.

Action Effects of Embodiment

The detection unit S includes the strain body 21 disposed in the bottom portion of the case C, the operating body 22 that is in contact with the strain body 21, and the elastic member 26. Therefore, even when the position of the push rod 3 changes while the foot pedal 2 is stepped on, it is possible to make the strain body 21 and the operating body 22 come into contact with each other inside the case C with an ideal positional relation, and errors of detected stepping force are reduced.

Moreover, the elastic member 26 made of helical compression type springs is provided in order to transfer operating force of the push rod 3 to the operating body 22. Therefore, when the foot pedal 2 is stepped on, stepping stroke of the foot pedal 2 is absorbed and a necessary stroke is produced, and it is thus possible to cause biasing force of the elastic member 26 to act on the strain body 21 continuously.

In the detection unit S, the intermediate member 23 is provided, the elastic member 26 is made of the first spring 26a and the second spring 26b, and spring constants of the first spring 26a and the second spring 26b are set appropriately. Thus, a stroke during an operation, and operation reaction force at the time of the stepping operation are differentiated, thus realizing good operating sense of the foot pedal 2.

Furthermore, the intermediate rod 25 and the intermediate member 23 come into contact with each other through the shaft-shaped rubber body 25r, and the intermediate member 23 and the operating body 22 come into contact with each other through the cylindrical rubber body 23r. Therefore, in a process of operating the foot pedal 2, transition from characteristic L1 to characteristic L2 is done smoothly, thus making an operating sense of the foot pedal 2 natural.

In the detection unit S, the strain body 21 includes the funnel-shaped pressure-receiving surface 21s, and the operating body 22 includes the spherical contact surface 22s. When the funnel-shaped pressure-receiving surface 21s and the spherical contact surface 22s come into contact with each other, the spherical contact surface 22s of the operating body 22 comes into contact with a designated region of the funnel-shaped pressure-receiving surface 21s of the strain body 21 even when the position of the operating body 22 changes a little. As a result, pressure acts on the strain body 21 in the direction along the shaft center X, thereby realizing highly accurate detection.

Other Embodiments

The disclosure may be configured as follows in addition to the foregoing embodiment (components having the same functions as those of the embodiment share the same reference numerals and symbols as those described in the embodiment).

Another Embodiment a

Figure 7:
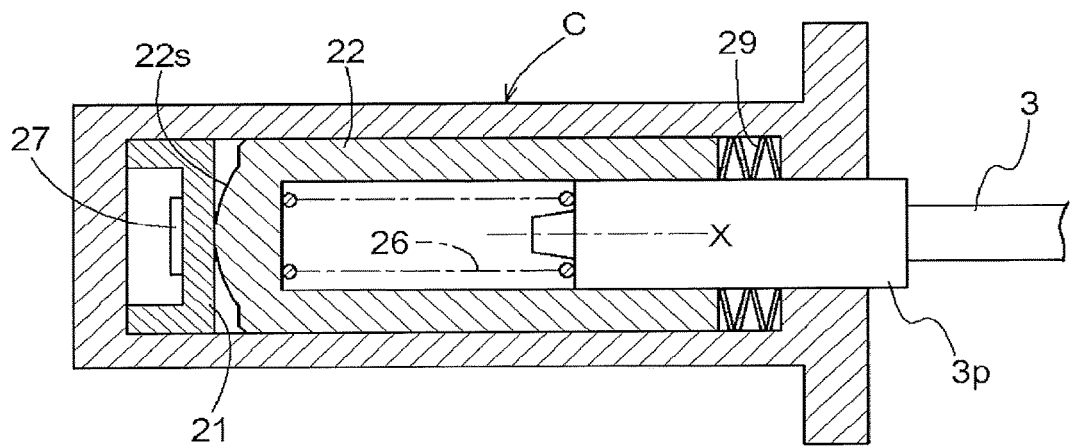

As shown in FIG. 7, a strain body 21 is housed in a bottom portion of a bottomed-cylindrical case C, and a bottomed-cylindrical operating body 22 is housed in the case C so that the bottomed-cylindrical operating body 22 is able to slide along a shaft center X with respect to the case C. An elastic member 26, and a plunger portion 3p that is formed integrally with a push rod 3 are housed inside the operating body 22. Thus, a pedal stepping force detector 100 is structured. With this structure, as a load applying portion that causes an initial load to act on the operating body 22, a plurality of disc springs 29 is disposed between an end portion of the operating body 22 and the case C.

In another embodiment a described above, the elastic member 26 is structured as a helical compression type spring, stepping force of a pedal 2 acts on the operating body 22 through the elastic member 26, and the stepping force acts on the strain body 21 from a contact surface 22s of the operating body 22. Further, with this structure, biasing force of the disc springs 29 acts on the operating body 22. Therefore, it is possible to decide an initial position of the operating body 22 with respect to the case C, and cause an initial load to act on the operating body 22.

Further, in another embodiment a, the disc springs 29 serving as the load applying portion are provided. Therefore, even when the foot pedal 2 is not stepped on, an initial load acting from the disc springs 29 brings the operating body 22 into contact with the strain body 21. In this state, there is no gap (play) between the operating body 22 and the strain body 21. Therefore, when the foot pedal 2 is stepped on, pressure acts on the strain body 21 from the beginning of the stepping operation, thus realizing accurate detection without time lag.

Another Embodiment b

Figure 8:
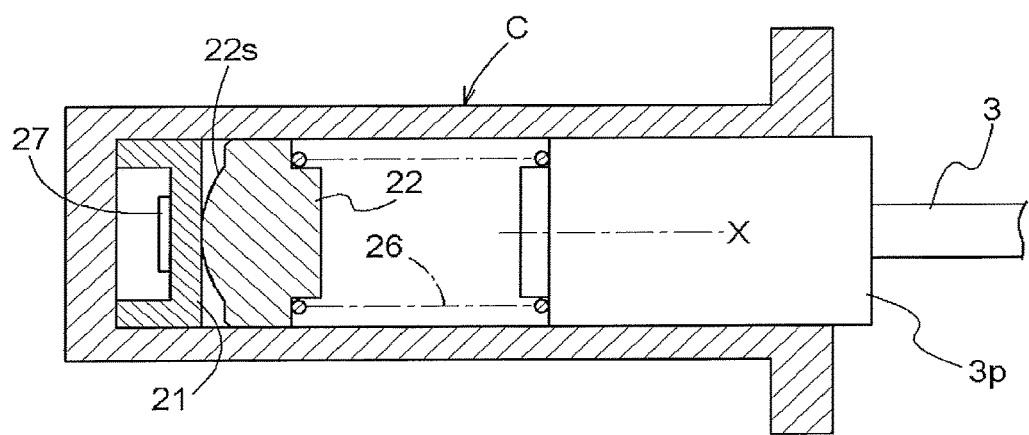
FIG. 8 is a sectional view of a pedal stepping force detector according to another embodiment b.

As shown in FIG. 8, a strain body 21 is housed in a bottom portion of a bottomed-cylindrical case C, and a block-shaped operating body 22 is housed in the case C so that the operating body 22 is able to slide along a shaft center X with respect to the case C. An elastic member 26, and a plunger portion 3p are housed in the case C. The elastic member 26 is on the opposite side of the operating body 22 from the strain body 21. The plunger portion 3*p* is formed integrally with a push rod 3. Thus, a pedal stepping force detector 100 is structured.

In another embodiment b described above, the elastic member 26 is structured as a helical compression type spring, and stepping force of a pedal 2 acts on the operating body 22 through the elastic member 26, and the stepping force is applied to the strain body 21 from a contact surface 22*s* of the operating body 22. With this structure, when the foot pedal 2 is stepped on, detection of operating force is realized.

Another Embodiment c

For an elastic member 26, rubber and resin that makes flexible elastic deformation may be used, and a flat spring may also be used.

Another Embodiment d

An elastic member 26 may be a single member. Alternatively, three or more elastic members 26 may be used. In a structure where three or more elastic members 26 are used, it is conceivable that an assist intermediate member and the like is used in addition to an intermediate member 23, and the elastic members 26 are disposed between an operating body 22 and the intermediate member, between the intermediate member and the assist intermediate member, and between the assist intermediate member and an intermediate rod 25, respectively.

Another Embodiment e

As a structure in which three or more elastic members 26 are used, it is conceivable that, for example, two coil springs having different coil diameters and free lengths are disposed between an operating body 22 and an intermediate member 23 so that, after one of the coil springs is compressed by a given amount, the other coil spring is compressed. As described above, by using the three or more elastic members 26 including the coil springs, it is possible to arbitrarily set a sense of a stepping operation of a foot pedal 2.

In particular, in the structure where the three or more elastic members 26 are used, it is conceivable that two or more intermediate members 23 are used, and the intermediate members 23 operate independently from one another. With this structure, a good operating sense in stepping the foot pedal 2 is realized.

Another Embodiment f

In a structure including an intermediate member 23, a load limiting mechanism may be structured so that, for example, the intermediate member 23 is brought into contact with a projection that projects from an inner wall of a case C.

The disclosure may be used for a pedal stepping force detector that detects stepping force acting on a pedal as an electrical signal.

The disclosure is characterized by including a rod that is operated along a longitudinal direction by stepping force from a pedal, a bottomed-cylindrical case that extends along the longitudinal direction of the rod, a strain body that is housed in a bottom portion of the case, an operating body that is housed in the case so that the operating body is in contact with the strain body, the strain body including a strain detecting element that detects strain of the strain body, and an elastic member that is compressed as the rod is operated by stepping force from the pedal and thus causes biasing force to act on the operating body.

With the above characteristic structure, when the pedal is stepped on and the rod operates in the longitudinal direction, the elastic member is compressed in association with the operation, and thus absorbs a stroke of the pedal. At the same time, biasing force from compression of the elastic member acts on the strain body through the operating body. With this structure, when the pedal is stepped on, biasing force of the elastic member acts on the strain body while a given stroke is produced. Thus, detection of strain of the strain body by the strain detecting element is realized. Further, with this structure, the strain body is disposed in the bottom portion of the bottomed-cylindrical case, and the operating body is operated along an inner surface of the case. Therefore, even when a position of the rod changes as the pedal is stepped on, a positional relation between the strain body and the operating body remains unchanged, thereby minimizing errors contained in detected stepping force. Accordingly, structured is a pedal stepping force detector that detects stepping force of the pedal highly accurately, and provides neutral operation sense of the pedal.

As another structure, a spherical contact surface may be formed in the operating body, and a funnel-shaped pressure-receiving surface centering about a shaft center of the case may be formed in the strain body such that the spherical contact surface is fitted into the funnel-shaped pressure-receiving surface.

With this structure, even when a position of the operating body changes inside the case, the spherical contact surface of the operating body comes into contact with a designated region of the funnel-shaped pressure-receiving surface of the strain body. Therefore, pressure acts on the strain body in a direction along the shaft center, thereby restraining detection errors.

As another structure, a load limiting mechanism may be further provided. The load limiting mechanism limits an operation of the operating body and transfers force from the rod to the case when the rod is operated by a predetermined amount.

With this structure, when the pedal is stepped on and the rod is operated by a predetermined amount, the load limiting mechanism limits an operation of the operating body, and transfers force from the rod to the case. Therefore, it is possible to make an operator realize that the limit is reached from an operating sense of the pedal, and also cause operating force from a stepping operation of the pedal to continuously act onto the operating body through the elastic member, so that the strain detecting element is able to detect stepping force of the pedal.

As another structure, the operating body may have a cylindrical portion, and the elastic member may be housed in the cylindrical portion.

With this structure, stepping force from the pedal acts on the operating body through the elastic member, and, because of the action of biasing force from compression of the elastic member, the operating body is brought into pressure contact with the strain body. In this structure, since the elastic member is disposed inside the operating body, it is possible to decide an initial position of the operating body with respect to the case, and cause initial biasing force to act on the operating body.

As another structure, a load applying portion may be further provided between the operating body and the case. The load applying portion causes an initial load to act on the operating body so that the operating body comes into contact with the strain body.

With this structure, even in a situation where the pedal is not stepped on, an initial load acting from the load applying portion allows the operating body to be in contact with the strain body. In this state, since there is no gap (play) between the operating body and the strain body, when the pedal is stepped on, pressure acts on the strain body at the beginning of the stepping operation, and accurate detection is thus realized.

As another structure, the operating body may be housed inside the case so that the operating body is able to move, and the elastic member may be housed inside the case on an opposite side of the operating body from the strain body.

According to the foregoing, stepping force from the pedal acts on the operating body through the elastic member, and the operating body is thus brought into pressure contact with the strain body. With this structure, it is possible to dispose the operating body and the elastic member adjacent to each other inside the case, thereby making the structure simple.

What is claimed is:

1. A pedal stepping force detector comprising:
   a rod that is operated along a longitudinal direction by stepping force from a pedal;
   a case having a bottomed-cylindrical shape and extending along the longitudinal direction of the rod;
   a strain body that is housed in a bottom portion of the case and includes a strain detecting element that detects strain of the strain body;
   an operating body including a cylindrical portion and that is housed in the case so that the operating body is in contact with the strain body; and
   an elastic member that is housed in the cylindrical portion and compressed as the rod is operated by stepping force from the pedal and thus causes biasing force to act on the operating body.

2. The pedal stepping force detector according to claim 1, wherein:
   the operating body includes a spherical contact surface; and
   the strain body includes a funnel-shaped pressure-receiving surface centering about a shaft center of the case such that the spherical contact surface is fitted into the funnel-shaped pressure-receiving surface.

3. The pedal stepping force detector according to claim 2, further comprising a load limiting mechanism that limits an operation of the operating body and transfers force from the rod to the case when the rod is operated by a predetermined amount.

4. The pedal stepping force detector according to claim 2, further comprising a load applying portion that causes an initial load to act on the operating body so that the operating body comes into contact with the strain body, the load applying portion being provided between the operating body and the case.

5. The pedal stepping force detector according to claim 4, wherein the load applying portion is a disc spring.

6. The pedal stepping force detector according to claim 2, wherein:
   the operating body is housed inside the case so that the operating body is able to move; and
   the elastic member is provided on an opposite side of the operating body from the strain body.

7. The pedal stepping force detector according to claim 1, further comprising a load applying portion that causes an initial load to act on the operating body so that the operating body comes into contact with the strain body, the load applying portion being provided between the operating body and the case.

8. The pedal stepping force detector according to claim 7, wherein the load applying portion is a disc spring.

9. The pedal stepping force detector according to claim 1, wherein:
   the operating body is housed inside the case so that the operating body is able to move; and
   the elastic member is provided on an opposite side of the operating body from the strain body.

10. The pedal stepping force detector according to claim 1, further comprising a load limiting mechanism that limits an operation of the operating body and transfers force from the rod to the case when the rod is operated by a predetermined amount.

* * * * *